April 20, 1948. E. W. KELLOGG 2,440,176
MOTOR DRIVE SYSTEM
Original Filed Dec. 21, 1939
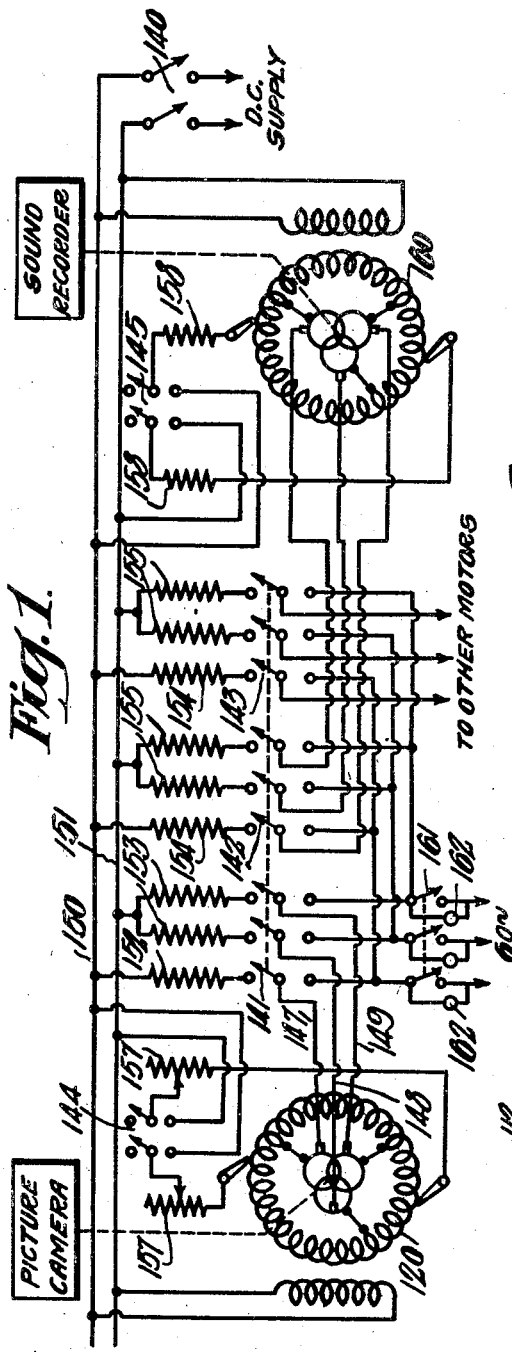
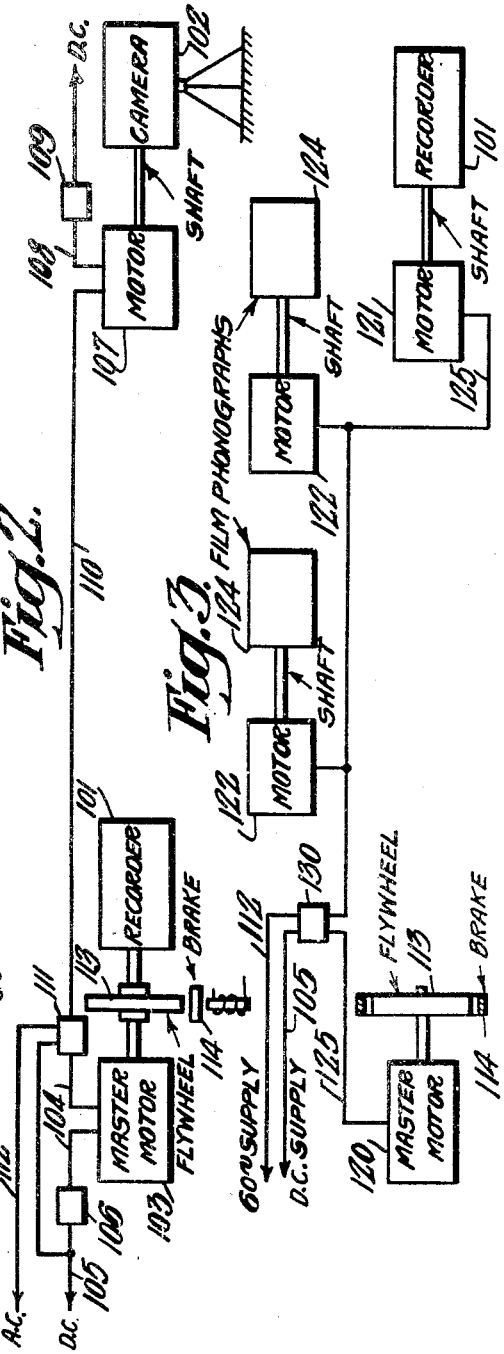
Inventor
Edward W. Kellogg
By C. D. Tuska
Attorney Patented Apr. 20, 1948

2,440,176

UNITED STATES PATENT OFFICE 2,440,176

MOTOR DRIVE SYSTEM

Edward W. Kellogg, Indianapolis, Ind., assignor to Radio Corporation of America, a corporation of Delaware Original application December 21, 1939, Serial No. 310,365, now Patent No. 2,295,664, dated September 15, 1942. Divided and this application April 30, 1942, Serial No. 441,149

8 Claims. (Cl. 318—41)

This invention relates to motor drive systems such as are useful in correlating the speeds of a plurality of separate motors under different conditions of operation, and has for its principal object the provision of an improved drive system and method of operation whereby variation in the relation between the speeds of such motors is obviated or minimized.

This application is a division of U. S. Patent 2,295,664, which issued September 15, 1942, on my application, Serial No. 310,365, filed December 21, 1939.

Where it is necessary to drive several mechanisms which cannot be mechanically interconnected but which must run in strict synchronism, it is in most applications satisfactory to operate the several mechanisms by means of synchronous motors all supplied from the same power system. In other applications, it is necessary that the synchronism be preserved throughout the operations of bringing the machines up to speed or stopping them. In other words, the several mechanisms are locked together as if mechanically interconnected, and this interconnection is not broken at any time. Where this is required, it is usual to employ Selsyn motors. These have been used for many years and their principle of operation is well known. Briefly stated, a Selsyn motor is essentially the same as a wound rotor induction motor. Both the rotor and stator windings are preferably polyphase, but one or the other may be single phase and the system still works. If the rotors of the several machines are connected together but not connected to any external source of power, and the stators are all supplied with alternating current from a common source, the rotors will seek a position at which the secondary or rotor winding voltages are substantially balanced and little cross current flows. If one of the rotors is forcibly turned, all of the other rotors seek a new position of equilibrium, and this following of one by the others continues for all speeds up to synchronism, although the torque by which the several motors are held in step or synchronism becomes weak as the rotor speed approaches the synchronous speed of the stator field. The frequency of the cross currents which hold the machines together approaches zero as synchronous speed is approached and likewise the voltage which drives the currents through the windings approaches zero. Therefore, it is not practical to operate Selsyn motors close to synchronous speed. It is common to operate them at from one-half to two-thirds of synchronous speed. It is equally possible to use the rotor windings as the primary to which the A.-C. voltage is applied and to interconnect the stators which then act as secondary.

An important example of the application of Selsyn motors is in recording sound for motion pictures. In this work it is necessary to thread film records into a number of reproducing machines in such positions that the contribution of each original record to the final recording in which these various original records are combined will occur at exactly the right time. The only practical way to preserve this synchronism is to have the machines so arranged that they will all come up to speed together, run together and slow down together.

Although Selsyn motors have been fairly satisfactory for this purpose, they are not above reproach. In certain applications, of which recording sound is a striking example, a degree of speed constancy is required far in excess of that which is needed for most other purposes. Synchronous driving systems, whether employing ordinary synchronous motors or Selsyn motors, are subject to hunting or an oscillatory action superimposed on their continuous rotation. This phenomenon has been recognized for years in synchronous motors and is well understood. The oscillations in many cases are not continuous and, after a disturbance, persist for only a few cycles, but they are started again by any little disturbance in power supply or load. The cure for hunting lies in endowing the motors with the property of damping out oscillations. Synchronous motors can be given very powerful damping properties by use of pole face grids. The same expedient is not applicable to Selsyn motors and these are inherently more subject to oscillations and do not give as high an order of speed constancy as the synchronous motors. Builders of Selsyn motors have resorted to such expedients as coupling mechanical damping devices to the motors which absorb energy from any oscillatory movement. This method is helpful but heavy and cumbersome, and not as satisfactory as the damping that is obtained in synchronous motors. It is the purpose of my invention to provide Selsyn motor systems with the superior damping which characterizes synchronous motor systems, which at the same time preserving the indispensable features of the Selsyn system of being able to maintain absolute synchronism from start to stop of a run. For this purpose, I employ Selsyn motors and a main driving motor exactly as in present Selsyn motor systems. As in present Selsyn systems, the driving motor drives a Selsyn unit which is called the master Selsyn, and is somewhat larger than the units attached to the film phonographs, cameras and recorders which are to be operated in synchronism.

The several motors are locked together by applying a polyphase voltage to all of the primary windings, which are here assumed to be the stators, all of the rotors or secondaries being connected together, but no voltage being applied to the secondaries. When the machines are thus locked together, the main motor is started, driving its master Selsyn, and all of the other motors respond by rotating at their appropriate relative speeds. There are cross currents between the secondary windings of the machines, and these cross currents flowing through the windings react with the rotating fields produced by the primary windings to supply the torques required by the several motors. If the chosen operating speed is two-thirds of synchronous speed, a four-pole Selsyn motor will run 1200 R. P. M. (instead of 1800 R. P. M., which is the speed at which a four-pole synchronous motor would run). Under these conditions, the secondary currents have a frequency of 20 cycles per second.

Up to the point of reaching running speed, my system operates exactly as an ordinary Selsyn driving system. From this point on, I provide the driven machines with the superior steadiness and freedom from hunting characteristic of the true synchronous motor, and this may be accomplished in the following manner:

The polyphase power supply is removed from the primary winding and a direct current connection substituted. This change is accomplished so rapidly that none of the machines has an opportunity to drop out of step or slip a pole during the moment of no power supply. The change can be made, for example, in about one-tenth second. When direct current instead of 60-cycle alternating current flows through the primary winding of the master Selsyn generator, the secondary current suddenly changes from 20 cycles to 40 cycles. The magnetic fields of the several motors, instead of rotating in space at synchronous speed, become stationary. The 40-cycle current now produced by the main generator reacts with this stationary field in the motors to provide the required driving torque. Fortunately, no appreciable shift in phase takes place in the course of this transition. The generator voltage and the counter electromotive forces of the motors were approximately balanced for the 20-cycle circulating current and they are now also approximately balanced for the 40-cycle current. The entire system now operates no longer as a Selsyn system but as a true synchronous generator and motors. The entire transfer of power is now accomplished by the 40-cycle current.

At the end of the run, the reverse operation is performed. The direct current supplied to the primary winding is removed and the polyphase alternating current restored. The machines then come to rest together in accordance with the standard Selsyn operation. Since the machines which I employ must serve during part of the time as Selsyn motors, they may not be provided with pole-face grids for damping. The reason for this is well understood by electrical engineers. The grids must have very little motion with respect to the magnetic field produced by the winding in the other member of the motor. In a synchronous motor, the poles are commonly in the rotor which is provided with pole-face grids, while the stator produces a field which rotates at synchronous speed. Since the rotor also revolves at synchronous speed, there is no relative motion between the stator field and the grids in the rotor. In the case of the Selsyn, there is a rotating field which is moving with respect to the primary at synchronous speed and with respect to the secondary at one-third synchronous speed. Poleface grids would have excessive currents induced in them and would destroy the effect of the rotating field, as well as produce a powerful torque tending to make the motor pull up to substantially full synchronous speed, acting as an induction motor. An effect exactly equivalent to the pole-face grids can be obtained in a synchronous motor by providing, in addition to the field winding (normally excited by direct current), a second winding placed at 90 electrical degrees from the main field winding and short-circuited upon itself. The spatial relationship between these two windings is the same as that between two windings of a polyphase alternating current winding. Thus, the polyphase primary winding of the Selsyn motor or generator may be made to serve as a direct current field winding and a short-circuited damping winding. If the primary winding is two-phase, this means simply supplying direct current to one of the polyphase windings and short-circuiting the other. In the case of a three-phase winding, the identical effect may be obtained by connecting two of the three terminals together and using this as one terminal for the direct current, the third terminal serving as the other direct current connection. I have operated Selsyn motors in this manner and have demonstrated the superior damping which may be obtained by thus operating them as synchronous motors. The direct current required is substantially the same as the maximum value of the alternating current, but since the only impedance to be overcome is the ohmic resistance of the conductors, a low voltage direct current supply, such as may be conveniently obtained from batteries, suffices.

For certain applications, it is important not only to prevent the slipping of a pole by any of the motors during a period of acceleration, but to provide an exact adjustment of phase position of the several machines within a small number of degrees of arc. This, for example, is the case in what is known as the background projection system employed in making motion pictures. The camera and the projector must be held in synchronism to within a very small angle of tolerance and it may be desirable to make adjustments of this angle. It is possible to produce variations in the angle at which the machines are locked together by slightly altering the distribution of direct current in the windings. This may be done by small series resistors in the direct current supply. The exact running position may then be controlled by setting these resistances at the proper values. This adjustment might be necessary to compensate for the effect of the load on the motor so that, if the machines are set with certain relations at standstill, the exact relation may be preserved during running. These resistances need not be so large as to materially impair the damping which depends on a virtually short-circuited winding. They only need to be comparable in magnitude with the resistance of the windings themselves in order to control the current distribution.

Figures 1 to 3 illustrate a motor system involving the use of a plurality of rotary converters, one of which is operated to control the others.

It is well known that rotary converters can be operated in parallel on both the A. C. and D. C. sides. This has been made the basis of the so-called "A. C.-D. C. interlock motor system," which has been commercially applied to motion picture production, where it is desired to run several machines in strict synchronism. The A. C.-D. C. interlock system has not been commercially applied to cases where it is desired to lock the machines together electrically at standstill and to bring them up in step. For this purpose, as has already been explained, Selsyn generators and motors have been employed. The reason that the A. C.-D. C. motors, which from the standpoint of their synchronization are simply synchronous A. C. machines, have not been used for interlocking from start is that neither they, nor any other synchronous generators, when they are turning over at very low speed as during starting, put out enough A. C. voltage to provide the necessary interchange of power to hold the machines together. For example, a generator which could supply 100 volts across the A. C. terminals at full speed would develop only one volt when it is just starting and the speed is only 1% of full speed. The A. C.-D. C. machine or rotary converter, however, can be made to perform the function of a switching device whereby it can supply an appreciable voltage across its A. C. terminals at standstill as well as at extremely low speeds. If enough voltage is applied to the direct current brushes, for example, to send several times normal full load current through the armature windings, the slip rings will assume voltages dependent on the positions of the taps in the windings to which they are connected. Thus, if the tap corresponding to slip ring A is connected to the commutator bar directly under the positive brush, this ring will have substantially the same potential as the brush. If the tap is half-way between brushes, the ring will be at mid-potential, or, if the tap is connected to the bar under the negative brush, the ring will be at full negative potential. The windings serve as a double path potentiometer and the slip rings are connected to this potentiometer at points which vary relative to the brushes. Thus, at standstill, the three rings, if the machine is wound for three-phase, will assume certain potentials dependent on the position of the armature and slip ring taps. If the armature is now rotated, no matter how slowly, the positions of the slip ring taps will shift from one brush to the other along the potentiometer paths in such a manner as to cause a rise and fall and reversal of slip ring potential. In the absence of load, this slip ring potential would be essentially a triangular or sharp peaked wave. If some load is drawn from the slip rings, the wave shape will be changed, but it will still be alternating in character, and, although containing overtones or harmonics, the voltage will have a large component of the fundamental frequency. The relative phase of the voltages at the three rings will depend on the positions of the taps to which they are connected. If the taps are 120 electrical degrees apart, the voltages will constitute a true three-phase system. Although movement of the armature conductors through the magnetic field of the machine may be so slow that the induced voltage from this cause is negligible, the machine can still supply a polyphase alternating voltage by pure resistance potentiometer effect. The ratio of A. C. to D. C. voltage under these conditions of operation will be substantially less than the ratio at full speed or normal operation, depending on the load, being of the order of from one-half to one-third of the voltage which this normal operation ratio would indicate.

If the slip rings of a machine, to which voltage has been applied on the D. C. side as just described, are connected to the polyphase terminals of a second machine, currents will flow between the two machines and these currents, flowing through the windings of the second machine, will react with the field thereof to lock the armature into a certain position. If the first machine is at standstill, the second machine will rotate to a suitable position and remain there even though considerable force is exerted to move it. If the armature of the first machine is rotated through a small angle, the distribution of currents in both machines changes, and the second machine moves to a new position. If the motion is continuous, the second machine rotates at the same speed at the first. Although the currents in the second machine will, in general, be much weaker than those in the first machine, the latter may be made several times full load current, under which conditions the currents in the second machine will be abundantly adequate to cause the armature to start up under load and rotate in synchronism with the first machine. This synchronous operation is maintained all the way from standstill to full speed. As soon as the speed has reached a point where the induced voltage in the windings of the first machine becomes considerable in comparison with the applied D. C. voltage, the excessive current in the windings of the first machine drops to a moderate value and the machines are thereafter locked together by normal synchronous motor action. This transition from control of the current by resistance only, to control by electromagnetically induced voltages, takes place at about the speed at which reactance in the motor windings begins to predominate over ohmic resistance.

If the D. C. voltage applied to the brushes of the first machine is from a low voltage, low resistance source, the machine will not come up to full speed, but will continue to run at a low speed. If the D. C. voltage is from a source having a voltage suitable for full speed operation, but if there is a suitable amount of resistance in the leads to prevent excessive current at standstill, then the D. C. voltage will continue to rise as the machine comes up to speed, while the input current falls. During the entire acceleration, the output voltage is boosted somewhat by the resistance effect which at very low speed was entirely responsible for the A. C. voltage.

It has been proposed by others to start several A. C.-D. C. motors together and bring them up in complete interlock by impressing a suitable D. C. voltage across the brushes of each machine and depending on the cross currents through the A. C. leads to hold the several machines in step. This method differs from the method of my invention in that I supply most of the D. C. to one machine only. The cross currents which serve to tie the machines together are not reduced in effectiveness by impressing D. C. across both machines. The actual current may be less but the current change which tends to retard whichever machine is ahead or to accelerate whichever machine is behind is increased by applying D. C. voltage to the second machine. In other words, the strength of the interlock effect at low speeds is increased by applying D. C. voltage to both machines. The difficulty with this method of bringing machines up to speed together lies in the fact that the direct current which flows in the windings of both machines exerts so powerful an accelerating torque that the interlock effect is almost negligible in comparison. The result is that, when several machines are started up in interlock in this manner, the amount of direct current which is supplied to each machine must be carefully adjusted to its load and, unless the direct current is kept to moderately small values, the entire system accelerates with great rapidity with the result that any differences in the inertia characteristics of the loads becomes magnified, tending to make the machine which must overcome the greater inertia, fall behind the machine which has less inertia load. In other words, both the friction load and the inertia loads need to be balanced. This results in an extremely critical system.

In accordance with my invention, I sacrifice the slight increase in interlocking torque which might be obtained from supplying a large amount of direct current to all of the machines, and depend for my interlocking polyphase current substantially entirely on the currents supplied from the slip rings of one machine, a relatively large direct current being supplied to its brushes. The other machines then operate essentially as synchronous motors, depending on the A. C. to supply an accelerating torque rather than on direct current supplied directly to their brushes. I may, however, supply a limited value of D. C. to the brushes of the other motors, sufficient only to overcome their frictional loads. By so doing, I reduce the amount of torque which must be supplied from the A. C. side but do not permit the torque developed by the D. C. in the windings to produce such a powerful forward torque as to require the A. C. interlock to exert an appreciable retarding torque. In order to produce enough A. C. output from the first machine which serves as a master for the group, I may supply its brushes for a short period with from three to six times normal full-load current. This results in a corresponding increase in the A. C. voltage and current available to be supplied to the other machines. This excessive D. C. in the winding of the first machine results in the development of a very powerful accelerating torque. Since, at the very low speeds, dependence is placed on the potentiometer effect for producing A. C. voltage, and electromagnetically induced voltage plays a negligible part, it would be possible to prevent the excessive torque by temporarily weakening the field of the master machine, the other fields being provided with full excitation from the start. This expedient, however, is undesirable for the reason that it is desirable to develop the induced voltage as early as possible in the course of acceleration. It might even be desirable to overexcite the fields of all of the machines during acceleration. I therefore permit the excessive torque to be developed in the first machine but prevent it from accelerating too rapidly by some mechanical means, as, for example, mounting a large flywheel on the motor shaft. The moment of inertia of the flywheel is sufficient to prolong the period of acceleration to such a point that the inertia effects to be overcome by the other machines play a negligible part. In other words, they need develop very little more torque than that required by their friction load. This makes it as easy for them to stay in step with the master machine during acceleration as it is after full speed is reached. The combination of the two expedients, namely, limiting the direct current supplied to the armatures of the machines which are to be held in synchronism with the first or master machine and reducing the rate of acceleration of the system, minimizes the requirements for interlocking torque and thereby insures the adequacy of the torque developed by the polyphase currents between the machines.

For some purposes, it is sufficient to insure that the machines be locked together at standstill, during acceleration and during the period of full speed operation. If this is all that is required, the arrangements already described will suffice, except that on cutting off the power supply the machine chosen as a master and provided with a large flywheel would coast excessively. It is therefore desirable that a brake be applied to this machine which will bring it to rest in a reasonable time. This brake can be automatically applied when the power is cut off. There are, on the other hand, numerous applications in which it is desirable not only to accelerate the several machines to full speed from standstill, in complete interlock, but to bring them to rest again in interlock and hold them so during preparations for another run. In order to accomplish this, I reverse the operation of starting. Instead of cutting off the D. C. power supply when the system is stopped, I permit the D. C. through the armature of the first machine to continue to flow, and to rise as the machine slows down to its original excessive value. Dependence must then be placed entirely on the brake to bring the machines to rest. As soon as the machines have come to rest, the D. C. supply to the master machine may be cut off.

The arrangement so far described will accomplish the requirements as set forth, namely, to lock the machines together at standstill, bring them up to speed, operate at full speed and slow all machines down together in interlock. If it is desired to hold the machines in interlock over an appreciable period of time at standstill, it is desirable to provide a change of connections whereby the currents which hold the machines in fixed relation will be supplied directly to the polyphase or slip ring conductors rather than to the brushes of any machine. This eliminates any tendency for any of the machines to try to run. The fields of all machines are maintained at full value, and D. C. voltage is applied to the conductors of the polyphase connections. This D. C. voltage may be applied between any two of the three conductors or between one conductor and the other two, which may be connected together. When the stationary locking current is applied in this manner, each machine receives its due proportion of the current, which, in the arrangement I have shown in Figure 1, can be independently adjusted. When the switches are closed which apply D. C. to the A. C. leads, the machines will, in general, execute a small rotation, since the position at which they came to rest will be random, whereas the application of D. C. to the A. C. conductors will force them to assume a specific position. This shift, however, will be less than 180 electric degrees and will not result in any slipping of poles. If desirable, an auxiliary commutator, not illustrated, may be employed, which will lock the machines at whatever position they have stopped, thus eliminating any possibility of their being caught on "dead center" and, therefore, not all executing identical movements. Alternatively, the brake may be arranged to bring the master machine to final rest in a specified position of its revolution. In general, these refinements will not be required.

Figure 2 illustrates in schematic form two A. C.-D. C. motors, one driving a sound recorder 101 and the other a camera 102. The master motor 103 is provided with input conductors 104 connected to a D. C. supply 105 through the switch box 106. The camera motor 107 is likewise supplied with D. C. input conductors and switch, designated respectively 108 and 109. The A. C. conductors 110 pass through a switch box 111 by which they may be connected either to the D. C. supply 105 or to a polyphase A. C. supply 112. The flywheel is shown at 113 with an electrically operated brake 114 to bring the master motor to rest.

If a comparatively large number of machines is to be operated in this manner, it is desirable to make the master motor larger than the others, in order that the resistance of its windings may not too greatly limit the current distributed to the oher machines. Such an arrangement is illustrated in Figure 1, where the master motor 120 is not shown as driving any of the machines, but it might do so if this appears to be desirable. Figure 3 shows another motor at 121 driving a recorder 101 and other motors 122, 122, driving film phonographs 124, 124. The connections shown at 125 represent multi-conductor cables or groups of cables through which each of the motors 121, 122 is connected individually on both its A. C. and D. C. sides to switch box 130, where suitable switches are provided to accomplish the several switching operations already described.

Typical switching arrangements are shown in Fig. 1 except that some obviously desirable switches are omitted for the sake of simplicity; as, for example, switches through which the fields are excited. A number of switches are shown in the drawing and it is to be understood that these would normally be operated as a unit, either by mechanically connecting the various switch blades together or by providing a suitable group of relays, which operate from a main control and perform the switching operations.

For putting the system into operation, the master D. C. switch 140 is closed, thereby exciting the fields of all of the machines. In order to lock all of the machines together at standstill, the group of switches indicated at 141, 142, 143, 144 and 145 would all be thrown to the upper position. This, it will be noted, does not apply any D. C. to the brushes of any of the machines, but supplies D. C. to the polyphase conductors 147, 148, 149 and to the corresponding slip ring conductors of the several motors. This D. C. for locking the machine together is supplied through resistors 152 to 155 inclusive, these resistors having been adjusted to send current of suitable magnitude through each machine. When the system is to be started, switches 141 to 145 inclusive are thrown to the lower position which removes the D. C. voltage from the A. C. conductors 147, 148, 149 and establishes a through connection of these conductors from each machine to all of the others. Switch 144 connects the brushes of the master motor 120 to the D. C. supply, through the comparatively low resistance 157 which permit a large current to flow when the machines are at standstill. Switch 145 connects the motor 160, which may represent motor 107, 121 or 122 of the other figures, to the D. C. supply through resistances 158 which are of relatively high value and permit only enough D. C. to flow through the brushes of motor 160 to overcome load friction. The motors will now come up to speed in the manner already described. When full speed is reached, it may be desirable to synchronize all of the machines with a main 60-cycle polyphase power supply, the frequency of which is accurately maintained from the power house. For this purpose, switch 161 is shown. Synchronization would be performed in the manner that is common when large synchronous motors or alternators are brought up to speed by some auxiliary power and then synchronized with others. As one method of indicating the time to close switch 161, the synchronizing lamps 162 are indicated. There are well-known devices for automatically synchronizing machines with the line and any such automatic system may be employed. For stopping the system, switch 161 would be opened. The brake would be applied to the motor 120 and, as soon as it has been brought to rest, switches 141 to 145 inclusive would be thrown to the upper position whereby the machines are locked together for standstill. Resistances 157 are shown as variable, whereby the speed of the entire system may be controlled, as for example, to facilitate synchronizing with the polyphase supply. The current limiting resistances 157, 157 and 158, 158 are shown as divided substantially equally between the positive and negative connections. If either the positive or the negative brushes are connected together through a low resistance connection, the master motor 120 will transfer a combination of D. C. and A. C. to the other machines, and the D. C. may produce too much forward torque. Moreover, the D. C. which thus flows between the machine robs the A. C. power transfer and thus weakens the interlock.

I claim as my invention:

1. In a drive system for the synchronous operation from standstill to full speed of a plurality of electrodynamic machines each provided with polyphase alternating current terminals and with direct current terminals, the combination of means for supplying direct current to said alternating current terminals for interlocking said machines at standstill, means for interconnecting said alternating current terminals, means for supplying a relatively large direct current to the direct current terminals of one of said machines and a relatively small direct current to the direct current terminals of the other of said machines for starting said machines, and means for sychronizing said machines with an alternating current supply source.

2. In a drive system for the synchronous operation from standstill to full speed of a plurality of electrodynamic machines each provided with polyphase alternating current terminals and with direct current terminals, the combination of switching means for supplying direct current to said polyphase terminals for locking said machines together at standstill and for interconnecting said polyphase terminals during the acceleration of said machines, and means for supplying relatively large and small values of direct current to said direct current terminals during said acceleration.

3. In a drive system for the synchronous operation from standstill to full speed of a plurality of electrodynamic machines each provided with polyphase alternating current terminals and with direct current terminals, the combination of switching means for supplying direct current to said polyphase terminals for locking said machines together at standstill and for interconnecting said polyphase terminals during acceleration of said machines, means for supplying relatively large and small values of direct current to said direct current terminals during said acceleration, alternating current supply terminals, and means for connecting said alternating current supply terminals to the alternating current terminals of said machines for normal operation of said machines.

4. In a drive system for the synchronous operation from standstill to full speed of a plurality of electrodynamic machines each provided with polyphase alternating current terminals and with direct current terminals, the combination of switching means for supplying direct current to said polyphase terminals for locking said machines together at standstill and for interconnecting said polyphase terminals during acceleration of said machines, means for supplying relatively large and small values of direct current to said direct current terminals for accelerating said machines, and braking means for decelerating said machines.

5. In a drive system for the synchronous operation from standstill to full speed of a plurality of electrodynamic machines each including a winding provided with polyphase alternating current terminals and with direct current supply terminals, the combination of means for interconnecting the alternating terminals of a plurality of said machines, means for supplying direct current to the direct current terminals of one of said machines, and means for preventing rapid acceleration of said machine.

6. In a drive system for the synchronous operation from standstill to full speed of a plurality of electrodynamic machines each including a winding provided with polyphase alternating current terminals and with direct current supply terminals, the combination of means for interconnecting the alternating terminals of a plurality of said machines, means for supplying direct current to the direct current terminals of one of said machines, means for preventing rapid acceleration of said machine, and mechanical means for bringing said machine to rest.

7. In the operation of a drive system for the synchronous operation from standstill to full speed of a plurality of electrodynamic machines, each provided with polyphase alternating current terminals and with direct current terminals, the method which includes supplying a direct current to one of said machines large in comparison with the normal operating current of said machine, retarding acceleration of said machine, and decelerating said machine to standstill while continuing to supply direct current to said machine.

8. In the operation of a drive system for the synchronous operation from standstill to full speed of a plurality of electrodynamic machines each including a winding provided with polyphase alternating current terminals and with direct current terminals, the method which includes supplying direct current to said polyphase terminals for interlocking said machines, interconnecting said polyphase terminals for accelerating said machines, supplying to the direct current terminals of one of said machines a direct current greater than that applied to the corresponding direct current terminals of the other of said machines, and applying a retarding force to the machine supplied with said greater direct current.

EDWARD W. KELLOGG.

REFERENCES CITED

The following references are of record in the file of this patent:

UNITED STATES PATENTS

| Number | Name | Date |
|---|---|---|
| 845,725 | Aichele | Feb. 26, 1907 |
| 2,182,630 | Kengon | Dec. 5, 1939 |

FOREIGN PATENTS

| Number | Country | Date |
|---|---|---|
| 193,458 | Great Britain | Feb. 26, 1923 |